US010876610B2

United States Patent
Fields et al.

(10) Patent No.: US 10,876,610 B2
(45) Date of Patent: Dec. 29, 2020

(54) SELF-LOCKING NUT AND SCREW ASSEMBLY

(71) Applicant: Eaton Intelligent Power Limited, Dublin (IE)

(72) Inventors: Thomas J. Fields, Grand Rapids, MI (US); Sorin Gavriliuc, Caledonia, MI (US); Christopher J. Jezewski, Coopersville, MI (US); Tyler Q. Curtis, Rockford, MI (US)

(73) Assignee: Eaton Intelligent Power Limited, Dublin (IE)

(*) Notice: Subject to any disclaimer, the term of this patent is extended or adjusted under 35 U.S.C. 154(b) by 81 days.

(21) Appl. No.: 16/003,634

(22) Filed: Jun. 8, 2018

(65) Prior Publication Data

US 2019/0003563 A1     Jan. 3, 2019

Related U.S. Application Data

(60) Provisional application No. 62/527,171, filed on Jun. 30, 2017.

(51) Int. Cl.
*F16H 27/02* (2006.01)
*F16H 25/18* (2006.01)
(Continued)

(52) U.S. Cl.
CPC ......... *F16H 25/2454* (2013.01); *F16H 25/20* (2013.01); *F16H 25/205* (2013.01);
(Continued)

(58) Field of Classification Search
CPC .. F16H 25/20; F16H 25/2006; F16H 25/2015; F16H 25/2021; F16H 25/2025; F16H 25/205; F16H 25/2204; F16H 25/24; F16H 25/2454; F16H 25/2472; F16H 2025/2012; F16H 2025/2071;
(Continued)

(56) References Cited

U.S. PATENT DOCUMENTS 2,623,403 A * 12/1952 Terdina ............... F16H 25/2204
                                                        74/89.39
2,630,022 A *  3/1953 Terdina ................. F16H 25/205
                                                        74/89.3
(Continued)

FOREIGN PATENT DOCUMENTS

DE     102009028568 A1     2/2011
FR         2912483 A1      8/2008
(Continued)

OTHER PUBLICATIONS

Machine translation of FR 2912483 A1 obtained on Nov. 25, 2019.*
International Search Report, FR1856066, dated Sep. 18, 2019.

*Primary Examiner* — Adam D Rogers
(74) *Attorney, Agent, or Firm* — Fishman Stewart PLLC

(57) ABSTRACT

A self-locking nut and screw assembly may include a screw and a first nut rotatable and linearly translatable with respect to each other. The assembly may also include a first motor configured to provide torque to one of the screw and the first nut. The assembly may further include a locking mechanism configured to lock the screw to prevent backdrive when the motor is not providing torque to the one of the screw and the first nut.

20 Claims, 3 Drawing Sheets

(51) Int. Cl.
　　　*F16H 35/00*　　　(2006.01)
　　　*F16H 25/24*　　　(2006.01)
　　　*F16H 25/22*　　　(2006.01)
　　　*F16H 25/20*　　　(2006.01)

(52) U.S. Cl.
　　　CPC ... *F16H 25/2204* (2013.01); *F16H 2025/209* (2013.01); *F16H 2035/005* (2013.01)

(58) Field of Classification Search
　　　CPC ..... F16H 2025/2075; F16H 2025/2084; F16H 2025/209; F16H 2035/005
　　　See application file for complete search history.

(56) References Cited

U.S. PATENT DOCUMENTS

| | | | | |
|---|---|---|---|---|
| 6,142,032 | A * | 11/2000 | Creager | F16H 25/2006 74/441 |
| 7,506,557 | B2 * | 3/2009 | Hosokai | F16H 25/2006 74/411 |
| 9,062,747 | B2 * | 6/2015 | Gunter | F16H 25/12 |
| 2003/0094056 | A1 * | 5/2003 | Park | F16H 25/2209 74/89.42 |

FOREIGN PATENT DOCUMENTS

| | | |
|---|---|---|
| JP | 2009243621 A | 10/2009 |
| WO | 2016/172029 A1 | 10/2016 |

* cited by examiner

SELF-LOCKING NUT AND SCREW ASSEMBLY

CROSS-REFERENCE TO RELATED APPLICATION

This application claims the benefit of U.S. Provisional Patent Application Ser. No. 62/527,171, filed on Jun. 30, 2017, the disclosure of which is hereby incorporated herein by reference in its entirety.

TECHNICAL FIELD

The present disclosure generally relates to a self-locking ball nut and screw assembly, and methods of using a self-locking ball nut and screw assembly to limit backdrive.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

In some circumstances, vehicles, including, but not limited to, aircraft, may incorporate high efficiency mechanisms, such as those employing ball screws. Such mechanisms may be inherently easily back-drivable due to the large loads experienced during operation. Backdrive may in turn cause control surfaces to shift from a desired position, which can cause control issues. However, several applications, including, but not limited to, aerospace applications, may require irreversibility with a design to prevent such control issues of the surfaces. To prevent or limit backdrive, mechanisms may incorporate no-back designs that can reduce efficiency. However, such designs may add weight and envelope space, and/or introduce reliability issues.

There is a desire for solutions/options that minimize or eliminate one or more challenges or shortcomings of nut and screw assemblies. The foregoing discussion is intended only to illustrate examples of the present field and should not be taken as a disavowal of scope.

SUMMARY

In embodiments, an exemplary self-locking nut and screw assembly may include a screw and a first nut rotatable and/or linearly translatable with respect to each other. The assembly may also include a first motor configured to provide torque to one of the screw and the first nut. The assembly may further include a locking mechanism configured to lock the screw to prevent backdrive when the motor is not providing torque to the one of the screw and the first nut With embodiments, a method of limiting backdrive may include providing a screw, providing a nut configured for connection with the screw, providing a motor connected to drive one of the screw and the nut, driving the one of the screw and the nut via the motor, and limiting backdrive by locking the screw via a locking mechanism only when the motor is not driving the one of the screw and the nut.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
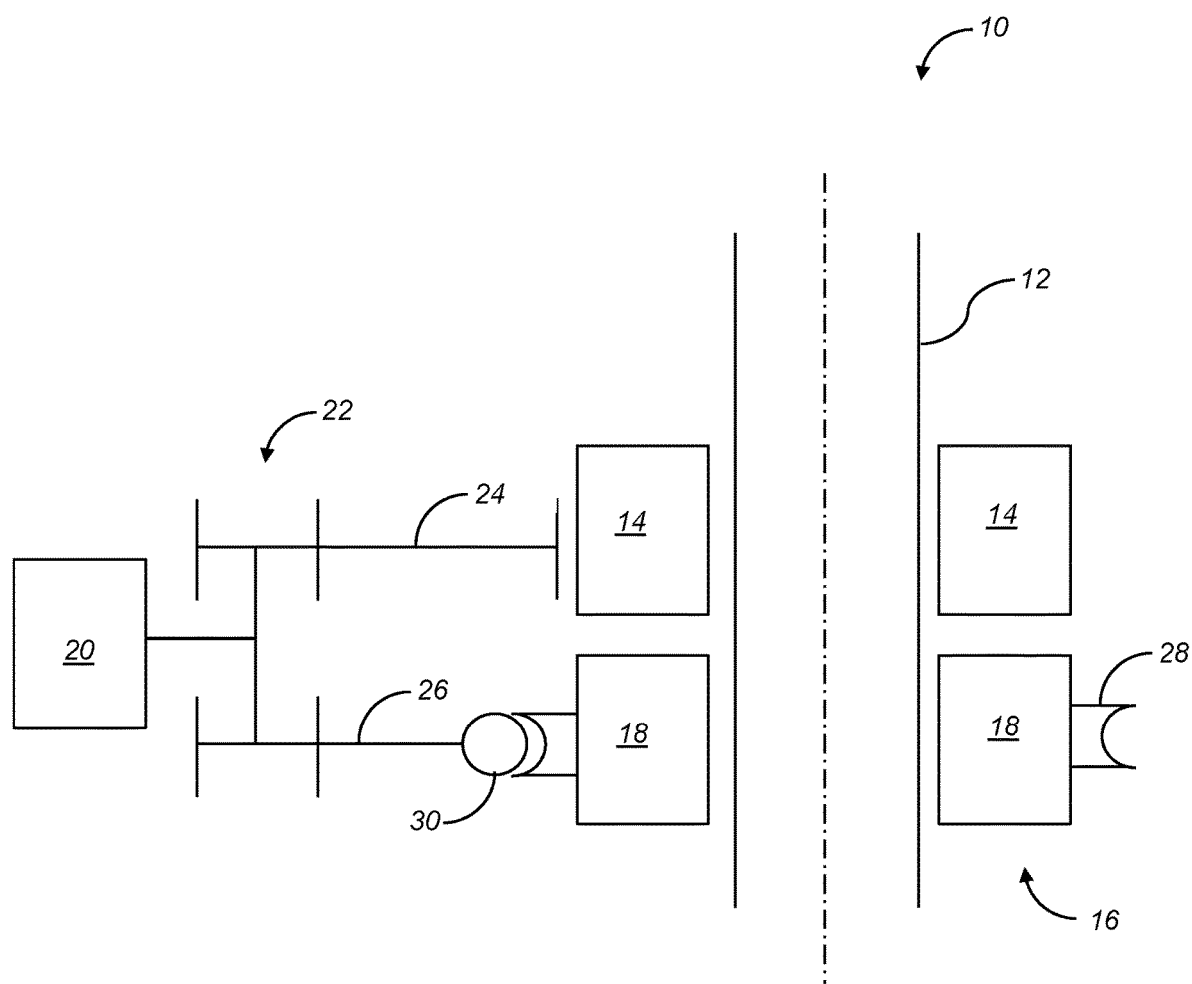
FIG. 1 is a schematic illustration of an embodiment of a self-locking nut and screw assembly embodying aspects or teachings of the present disclosure.
Figure 2:
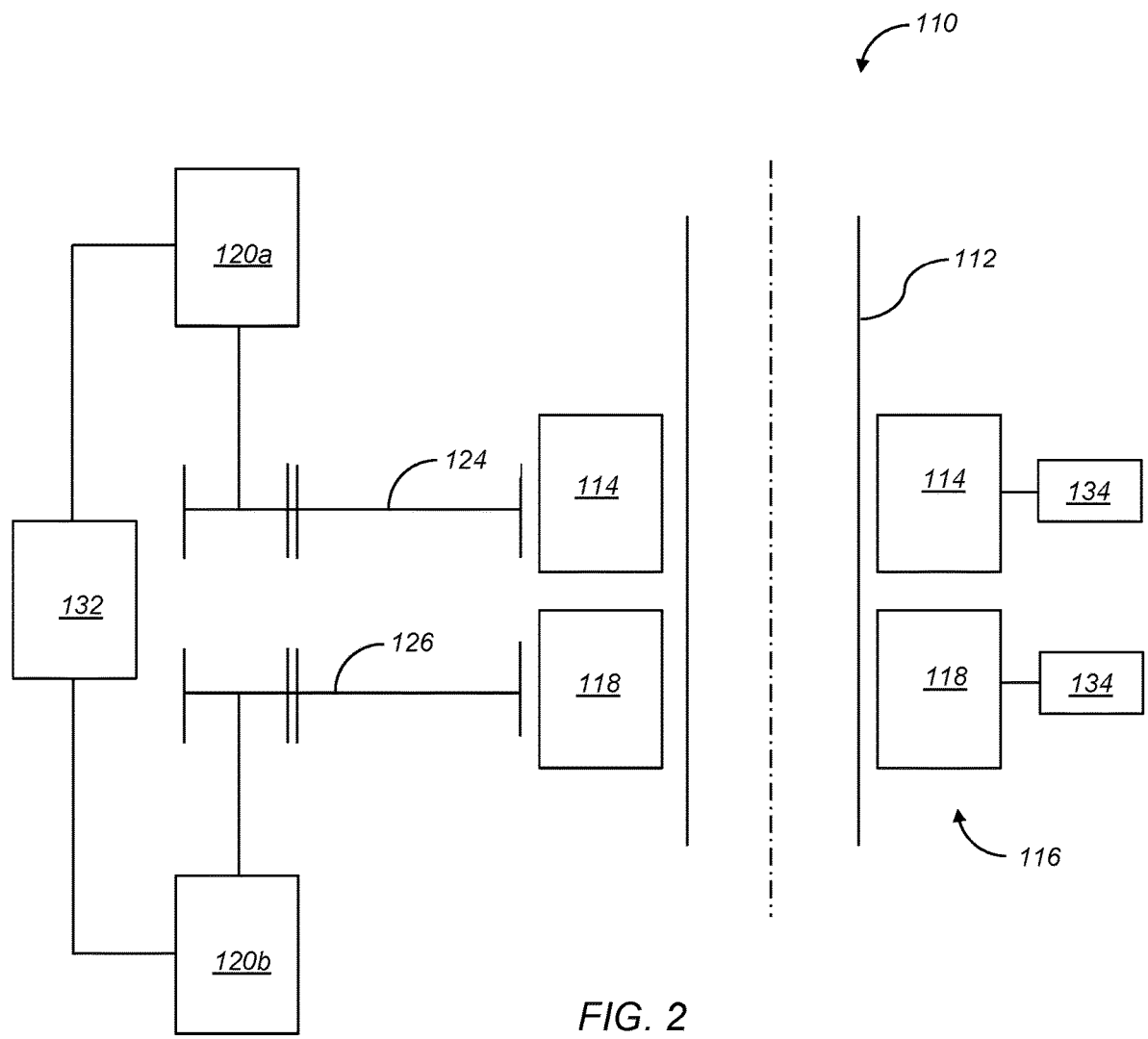
FIG. 2 is a schematic illustration of another embodiment of a self-locking nut and screw assembly embodying aspects or teachings of the present disclosure.
Figure 3:
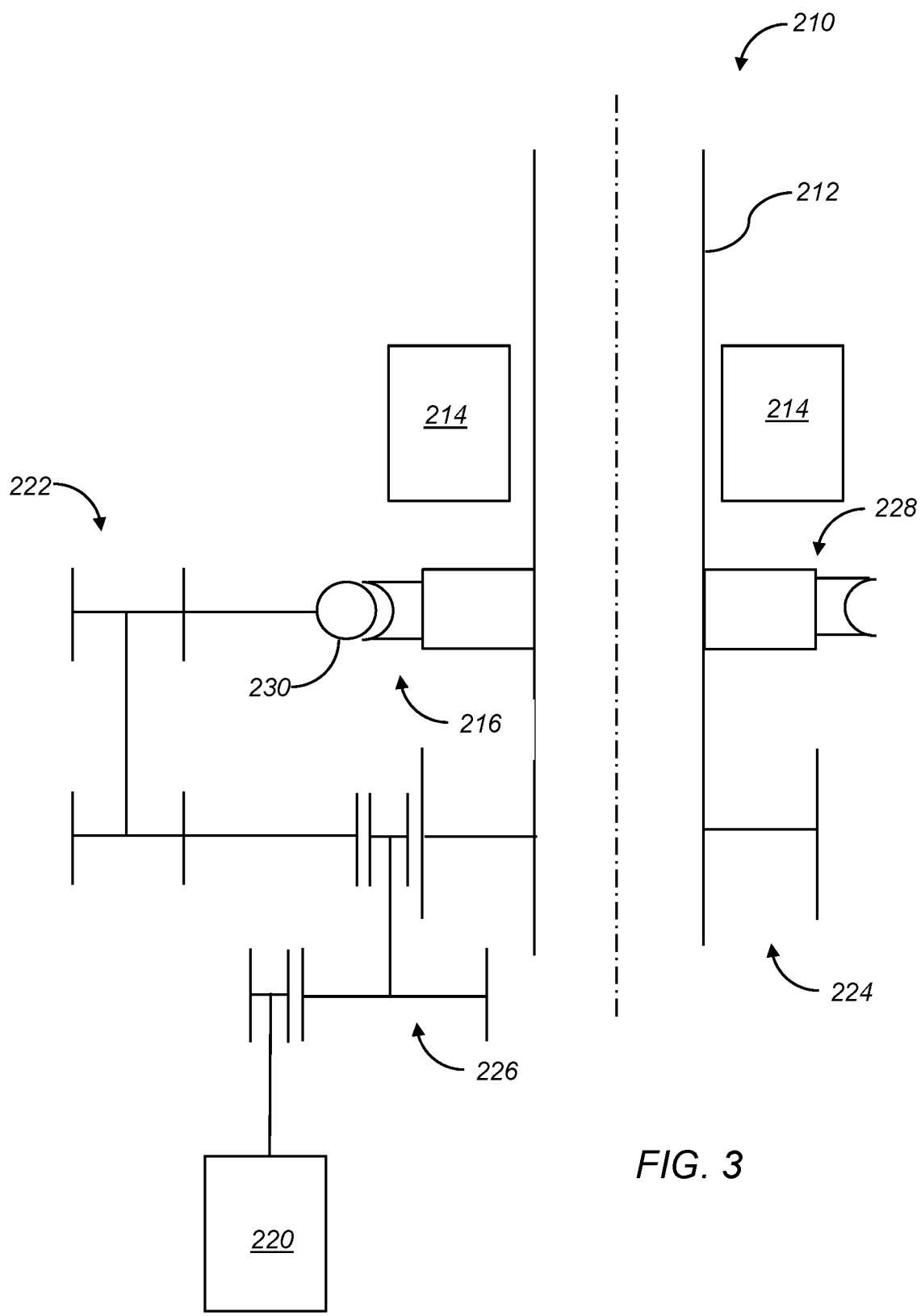
FIG. 3 is a schematic illustration of another embodiment of a self-locking nut and screw assembly embodying aspects or teachings of the present disclosure.

As generally illustrated in FIGS. 1-3, embodiments of a self-locking nut and screw assembly 10, 110, 210 may include a screw 12, 112, 212 and a first nut 14, 114, 214. The screw 12, 112, 212 may be, but is not limited to, a ball screw, a roller screw, and the like, and the first nut 14, 114, 214 may be, but is not limited to, a ball nut, a roller nut, and the like. The screw 12 and the first nut 14 generally may be rotatable with respect to each other, thereby enabling linear translation of the screw 12, 112, 212 and/or the first nut 14, 114, 214. The first nut 14, 114, 214 generally may have a thread profile allowing for a high efficiency, for example, above 75%. In embodiments, the efficiency may be over 80%. The assembly 10, 110, 210 may also include a locking mechanism 16, 116, 216 configured to lock the screw 12, 112, 212 to prevent backdrive, such as described further herein.

In an embodiment, such as generally illustrated in FIG. 1, the locking mechanism 16 may include a second nut 18, which may also be rotatable and/or linearly translatable with respect to the screw 12. The second nut 18 may be, but is not limited to, an acme screw nut, and generally may be low efficiency for example, below 50%. In embodiments, the efficiency may be lower than 40%. The low efficiency may cause the screw 12 to lock when it engages with the threads of the second nut 18.

With embodiments, an assembly 10 may include a motor 20 (which may be a single motor) configured to provide torque to the first nut 14 and/or the second nut 18. The assembly 10 may further include a differential 22 (e.g., a differential gear assembly) operatively connecting the motor 20 to the first nut 14 via first gearing 24 and to the second nut 18 via second gearing 26, such that the torque from the motor 20 may be asymmetrically applied/transferred to the first nut 14 and the second nut 18. The first gearing 24 may comprise, for example and without limitation, a spur gear. The second gearing 26 may comprise, for example and without limitation, a worm ring or ring gear 28 and a worm gear 30.

In embodiments, when the motor 20 is activated, torque may be asymmetrically applied/transferred to the first nut 14 and the second nut 18 via the differential 22, a first gearing 24, and a second gearing 26. The applied/transferred torque to the second nut 18 may cause the second nut 18 to disengage from the screw 12 such that the screw 12 may operate in a high efficiency mode via the first nut 14.

With embodiments, when the motor 20 is not active, there may be backdrive forces acting on the screw 12. Such backdrive forces may rotate the first nut 14, thereby causing the screw 12 to translate until it engages with the low efficiency second nut 18, particularly via the respective threads of the screw 12 and the second nut 18. When this occurs, the screw 12 may cease linear movement or jam in view of the low efficiency of the second nut 18, thereby limiting and/or preventing backdriving of the screw 12. In addition, the ring gear 28 may be engaged with the worm gear 30 to prevent backdriving of the second nut 18. Thus, the assembly 10 may prevent backdriving in both directions, as controlled by backlash or endplay between the drive systems of the first nut 14 and the second nut 18. Specifically, the endplay between the first nut 14 and the screw 12 may be larger than the endplay between the second nut 18 and the screw 12, which may allow the torque from the motor 20 to unlock the second nut 18 first, i.e., disengage the second nut 18 from the screw 12, before providing torque to the first nut 14, which would be the path of least resistance in view of the higher efficiency of the first nut 14.

In embodiments, such as illustrated in FIG. 2, a locking mechanism 116 may include a second nut 118, which may be rotatable and/or linearly translatable with respect to the screw 112. The second nut 118 may be, but is not limited to, an acme screw nut, and generally may be low efficiency, for example, below 50%. In embodiments, the efficiency may be lower than 40%. The low efficiency may cause the screw 112 to lock when it engages with the threads of the second nut 118.

With embodiments, an assembly 110 may include two motors 120a, 120b, and each may be dedicated to one of the first nut 114 and the second nut 118. The motors 120a, 120b may comprise, for example and without limitation, brushless DC motors. Each motor 120a, 120b may be connected to the respective one of the first nut 114 and the second nut 118 via first gearing 124 and second gearing 126, respectively. The first gearing 124 and the second gearing 126 may comprise, for example and without limitation, spur gears. The first gearing 124 and the second gearing 126 may be configured to operate independently of each other.

In embodiments, the first motor 120a and the second motor 120b may be configured to provide separate torques to the first nut 114 and the second nut 118, such that the first nut 114 and second nut 118 may have differential or asymmetrical rotation, similar to assembly 10. Thus, the second motor 120b may be activated first to cause the second nut 118 to disengage from the screw 112 (e.g., to unlock the screw 112). The first motor 120a may then be activated, such that the screw 112 may operate in a high efficiency mode with the first nut 114. The assembly 110 may include a controller 132 (e.g., an electronic controller) to control and/or synchronize the operation of the first motor 120a and the second motor 120b. The assembly 110 may further include position sensors 134 configured to communicate respective positions of the first nut 114 and second nut 118 to the controller 132. Additionally or alternatively, position feedback may be provided by hall transition counts within the motors 120a, 120b themselves. Such position feedback may be used (e.g., by the controller 132) to ensure that the motors 120a, 120b are activated and/or deactivated when the first nut 114 and/or the second nut 118 are in appropriate positions, thereby helping to ensure that the screw 112 operates in the high efficiency mode.

With embodiments, when the motors 120a, 120b are deactivated, there may be backdrive forces acting on the screw 112. The screw 112 may translate until it re-engages with the low efficiency second nut 118, for example, via the respective threads of the screw 112 and the second nut 118. When this occurs, the screw 112 may cease linear movement or jam in view of the low efficiency of the second nut 118, thereby inhibiting or preventing backdriving of the screw 112.

In another embodiment, such as generally illustrated in FIG. 3, the locking mechanism 216 may include a worm ring or ring gear 228 that may be integral with or attached/connected to the screw 212, and a worm gear 230. The assembly 210 may also include a spur gear 224 that may be integral with the screw 212, and a motor 220 configured to provide torque to the spur gear 224 and the worm gear 230. A ring gear 228 may be configured to engage the worm gear 230. The assembly 210 may further include a gear train 226 connecting the motor 220 to the spur gear 224, and a differential 222 connected to the gear train 226 and the worm gear 230.

With embodiments, when there is no command for the motor 220 (while the motor is not transferring torque to the screw 212), backdriving forces may act on the first nut 214, thereby causing the screw 212 to rotate. The spur gear 224 may transfer the backdriving forces to a motor 220 through the gear train 226 until tooth flanks on the ring gear 228 contact the worm gear 230, which is not backdrivable. That may cause the locking mechanism 216 to lock. As such, the locking and prevention of backdrive may be dependent on backlash between the ring gear 228 and the worm gear 230. Generally, the endplay between the first nut 214 and the screw 212 may be larger than the endplay between the locking mechanism 216 and the screw 212, which may permit the torque from the motor 220 to unlock the locking mechanism 216 first, i.e., disengage the ring gear 228 and the worm gear 230, before providing torque to the first nut 214, which can be the path of least resistance in view of the higher efficiency of the first nut 214.

It should be appreciated that the assemblies 10, 110, 210 may include other mechanisms and/or configurations to cause the locking mechanisms 16, 116, 216 to engage and disengage from the screws 12, 112, 212. Such mechanisms and/or configurations may, for example and without limitation, include one or more of a controlled gap between the first nut 14, 114, 214 and locking mechanism 16, 116, 216, spring packs, gearing from an actuator gearbox, an electromechanical solenoid, a secondary electromechanical actuator, a centrifugal force, and/or ball detent assemblies, among others.

With embodiments, a method of limiting backdrive may include providing a screw 12, 112, 212, providing a nut 14, 114, 214 configured for connection with the screw, providing a motor 20, 120a, 220 connected to drive one of the screw 12, 112, 212 and the nut 14, 114, 214, driving the one of the screw 12, 112, 212 and the nut 14, 114, 214 via the motor 20, 120a, 220, and/or limiting backdrive (in one or both directions) by locking the screw 12, 112, 212 via a locking mechanism 16, 116, 216 only when the motor 20, 120a, 220 is not driving the one of the screw 12, 112, 212 and the nut 14, 114, 214. A locking mechanism (e.g., locking mechanism 16, 116) may include a second nut 18, 118 that may include a lower efficiency than the nut 14, 114. A differential 22 may connected to the motor 20, the first nut 14, and the second nut 18. The differential 22 may asymmetrically transfer torque from the motor 20 to the first nut 14 and the second nut 18. A locking mechanism (e.g., locking mechanism 216) may include a ring gear 228 that may be integral with the screw 212 and a worm gear 230 connected to the motor 220 by an actuator gear train 226. A motor 220 may be connected to drive the screw 212. A spur gear 224 may be integral with the screw 212. Driving the screw 212 may include the motor 220 transferring torque to the spur gear 224 via the actuator gear train 226.

In embodiments, a controller (e.g., the controller 132) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory, and/or an input/output (I/O) interface. A controller may be configured to perform various functions, including those described in greater detail herein, with appropriate programming instructions and/or code embodied in software, hardware, and/or other media. In embodiments, a controller may include a plurality of controllers. In embodiments, a controller may be connected to a display, such as a touchscreen display.

In some figures, portions of certain embodiments may not be shown and/or may be hidden to more readily illustrate other portions.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. An assembly comprising:
   a screw and a first nut, the screw and the first nut are rotatable and linearly translatable with respect to each other;
   a first motor configured to provide torque to one of the screw and the first nut; and
   a locking mechanism including a second nut;
   wherein the first motor is configured to provide torque to the first nut via a first gearing and the second nut via a second gearing; a differential operatively connects the first motor to the first nut and the second nut; and the torque from the first motor is configured to be asymmetrically applied or transferred to the first nut and the second nut via the differential.

2. An assembly comprising:
   a screw and a first nut, the screw and the first nut are rotatable and linearly translatable with respect to each other;
   a first motor configured to provide torque to one of the screw and the first nut;
   a locking mechanism configured to lock the screw to prevent backdrive when the first motor is not providing torque to the one of the screw and the first nut; and
   a spur gear integral with the screw;
   wherein the locking mechanism includes a ring gear integral with the screw, and a worm gear engaging the ring gear; and the first motor is configured to provide torque to the screw via the spur gear, and to the locking mechanism.

3. The assembly of claim 2, including:
   an actuator gear train connecting the spur gear to the first motor; and
   a differential connected to the actuator gear train and the worm gear, the differential being configured to transfer torque from the first motor to the spur gear and to the worm gear, the worm gear being configured to transfer the torque to the ring gear;
   wherein, when the first motor is not active, the spur gear transfers backdriving forces to or into the first motor via the actuator gear train, and the ring gear contacts the worm gear to effectuate or lock the locking mechanism.

4. A method of limiting backdrive, the method comprising:
providing a screw;
providing a nut configured for connection with the screw;
providing a motor connected to drive one of the screw and the nut;
driving the one of the screw and the nut via the motor; and
limiting backdrive by locking the screw via a locking mechanism only when the motor is not driving the one of the screw and the nut;
wherein the locking mechanism includes a ring gear integral with the screw and a worm gear connected to the motor by an actuator gear train.

5. The method of claim 4, wherein the motor is connected to drive the screw; a spur gear is integral with the screw; and driving the screw includes the motor transferring torque to the spur gear via the actuator gear train.

6. An assembly comprising:
a screw and a first nut, the screw and the first nut are rotatable and linearly translatable with respect to each other;
a first motor configured to provide torque to one of the screw and the first nut; and
a locking mechanism configured to lock the screw to prevent backdrive when the first motor is not providing torque to the one of the screw and the first nut;
wherein the locking mechanism includes a second nut; the first nut is connected to the first motor via a first gearing, the second nut is connected to the first motor via a second gearing, and a gear path associated with the first nut has a higher efficiency than a gear path associated with the second nut as a result of at least one of:
the respective types and/or number of gears of the first gearing and the second gearing; and
the respective types of the first nut and the second nut; and
wherein the first motor is operatively connected to the first nut and the second nut via a differential.

7. The assembly of claim 6, wherein the differential is configured to asymmetrically transfer torque from the first motor to the first nut and the second nut via the first gearing and the second gearing.

8. The assembly of claim 7, wherein at least one of:
the first gearing includes a spur gear; and
the second gearing includes a ring gear and a worm gear.

9. The assembly of claim 6, including a second motor, wherein the first motor is operatively connected to the first nut via the first gearing, and the second motor is operatively connected to the second nut via the second gearing, the second gearing being independent from the first gearing.

10. The assembly of claim 9, including a controller configured to control the first motor and the second motor to asymmetrically provide respective torques to the first nut and the second nut.

11. The assembly of claim 10, including position sensors configured to provide feedback of positions of the first nut and the second nut to the controller.

12. The assembly of claim 9, wherein the first motor and the second motor are composed of brushless DC motors.

13. The assembly of claim 6, wherein an endplay between the first nut and the screw is larger than an endplay between the second nut and the screw.

14. The assembly of claim 6, wherein the first nut and the second nut are configured such that the first motor unlocks the second nut from the screw before providing torque to the first nut.

15. The assembly of claim 6, including a spur gear integral with the screw; wherein the locking mechanism includes a ring gear integral with the screw, and a worm gear engaging the ring gear; and the first motor is configured to provide torque to the screw via the spur gear, and to the locking mechanism.

16. The assembly of claim 15, including:
an actuator gear train connecting the spur gear to the first motor; and
the differential is connected to the actuator gear train and the worm gear, the differential being configured to transfer torque from the first motor to the spur gear and to the worm gear, the worm gear being configured to transfer the torque to the ring gear;
wherein, when the first motor is not active, the spur gear transfers backdriving forces to or into the first motor via the actuator gear train, and the ring gear contacts the worm gear to effectuate or lock the locking mechanism.

17. The assembly of claim 6, wherein the screw is a ball screw, and the first nut is a ball nut.

18. A method of limiting backdrive, the method comprising:
providing a screw;
providing a first nut configured for connection with the screw;
providing a motor connected to drive one of the screw and the first nut;
driving the one of the screw and the first nut via the motor; and
limiting backdrive by locking the screw via a locking mechanism only when the motor is not driving the one of the screw and the first nut; wherein the locking mechanism includes a second nut; the first nut is connected to the motor via a first gearing, the second nut is connected to the motor via a second gearing, and the second gearing has a lower efficiency than the first gearing as a result of at least one of:
the respective types and/or number of gears of the first gearing and the second gearing; and
the respective types of the first nut and the second nut;
wherein a differential is connected to the motor, the first nut, and the second nut; and the differential asymmetrically transfers torque from the motor to the first nut and from the motor to the second nut.

19. The method of claim 18, wherein the locking mechanism includes a ring gear integral with the screw and a worm gear connected to the motor by an actuator gear train.

20. The method of claim 19, wherein the motor is connected to drive the screw; a spur gear is integral with the screw; and driving the screw includes the motor transferring torque to the spur gear via the actuator gear train.

* * * * *